US010813436B2

(12) United States Patent
Hall

(10) Patent No.: US 10,813,436 B2
(45) Date of Patent: Oct. 27, 2020

(54) BACKPACK HAVING A DISPLAY

(71) Applicant: My Bag Corporation, Virginia Beach, VA (US)

(72) Inventor: Kevin Hall, Viginia Beach, VA (US)

(73) Assignee: My Bag Corporation, Virginia Beach, VA (US)

(*) Notice: Subject to any disclaimer, the term of this patent is extended or adjusted under 35 U.S.C. 154(b) by 0 days.

(21) Appl. No.: 16/705,496

(22) Filed: Dec. 6, 2019

(65) Prior Publication Data

US 2020/0113318 A1  Apr. 16, 2020

Related U.S. Application Data

(63) Continuation-in-part of application No. 15/853,097, filed on Dec. 22, 2017, now abandoned.

(60) Provisional application No. 62/439,717, filed on Dec. 28, 2016, provisional application No. 62/547,341, filed on Aug. 18, 2017.

(51) Int. Cl.
*A45F 3/04* (2006.01)
*A45C 13/08* (2006.01)
*B43L 1/00* (2006.01)

(52) U.S. Cl.
CPC ............ *A45F 3/04* (2013.01); *A45C 13/08* (2013.01); *B43L 1/008* (2013.01)

(58) Field of Classification Search
CPC . A45C 13/08; A45F 3/04; A45F 3/042; B43L 1/00; B43L 1/002; B43L 1/008; G06Q 30/0641; G06Q 30/0643
See application file for complete search history.

(56) References Cited

U.S. PATENT DOCUMENTS

| | | | | |
|---|---|---|---|---|
| 5,222,642 A | * | 6/1993 | Solarz | A45C 13/08 224/191 |
| 5,253,368 A | * | 10/1993 | Blake | A42B 1/248 2/195.1 |
| D381,704 S | * | 7/1997 | Li | D21/483 |
| 5,912,653 A | * | 6/1999 | Fitch | G09F 21/02 345/87 |
| 6,173,837 B1 | * | 1/2001 | Marconi | A45C 3/08 190/125 |
| 6,220,318 B1 | * | 4/2001 | Pinti | A45C 3/06 150/103 |
| 6,393,745 B1 | * | 5/2002 | Miki | G09F 27/00 224/627 |
| 6,414,693 B1 | * | 7/2002 | Berger | G06Q 10/087 345/641 |
| 6,982,115 B2 | * | 1/2006 | Poulos | A41D 27/08 156/230 |
| 7,265,970 B2 | * | 9/2007 | Jordan | G09F 21/02 361/679.27 |

(Continued)

*Primary Examiner* — Justin M Larson
(74) *Attorney, Agent, or Firm* — F. Michael Sajovec; Williams Mullen

(57) ABSTRACT

A customizable bag is provided that permits multiple types of customization. The bag includes a ferromagnetic platform coupled to one or more of the bag's panels. The ferromagnetic platform includes a magnetic material, a drawable surface, and may be printed with images or designs provided to the manufacturer or provider by the customer or other user. Also provided are systems for customizing a bag or creating a customizable bag.

16 Claims, 16 Drawing Sheets

(56) References Cited

U.S. PATENT DOCUMENTS

| | | | |
|---|---|---|---|
| 7,526,997 B2* | 5/2009 | Davidson | A63B 55/00 101/35 |
| 7,857,277 B2* | 12/2010 | Bertrand | A47B 97/08 248/461 |
| D670,764 S * | 11/2012 | Han | D20/19 |
| D670,915 S * | 11/2012 | Jablin | D3/321 |
| D673,362 S * | 1/2013 | Presman | D3/216 |
| 8,464,442 B1* | 6/2013 | Alford, II | A43B 1/0027 36/136 |
| 9,433,278 B2* | 9/2016 | Donahue | A45F 3/042 |
| 9,877,558 B1* | 1/2018 | Harstvedt | A45C 3/00 |
| 10,011,142 B1* | 7/2018 | Taylor | B32B 7/06 |
| 10,052,992 B2* | 8/2018 | Probst | B60N 3/002 |
| 10,070,709 B1* | 9/2018 | Polins | A45C 13/08 |
| 2003/0034369 A1* | 2/2003 | Haber | A45F 3/04 224/579 |
| 2004/0026280 A1* | 2/2004 | Herold | A63B 55/00 206/315.3 |
| 2004/0076000 A1* | 4/2004 | Thorp | A45F 3/04 362/154 |
| 2005/0110309 A1* | 5/2005 | Cziraky | A47B 23/002 297/181 |
| 2006/0163303 A1* | 7/2006 | Trutanich | A45F 3/04 224/576 |
| 2006/0195331 A1* | 8/2006 | Goldthwaite | G06Q 99/00 345/581 |
| 2006/0222858 A1* | 10/2006 | Haas | B43L 1/123 428/413 |
| 2008/0053610 A1* | 3/2008 | Schneider | B29C 63/0047 156/290 |
| 2008/0230158 A1* | 9/2008 | Romero | A45C 3/08 150/105 |
| 2009/0104360 A1* | 4/2009 | Gypen | B43L 1/002 427/372.2 |
| 2009/0266721 A1* | 10/2009 | Bala | A45C 11/24 206/214 |
| 2009/0294499 A1* | 12/2009 | McKinney | A45C 13/08 224/576 |
| 2011/0091860 A1* | 4/2011 | Supera | B32B 37/182 434/409 |
| 2012/0097495 A1* | 4/2012 | Moore | A45C 13/00 190/18 A |
| 2012/0241059 A1* | 9/2012 | Wilson | A45C 3/08 150/105 |
| 2013/0032502 A1* | 2/2013 | Anderson | A45C 13/00 206/457 |
| 2014/0026375 A1* | 1/2014 | Gibby | A45C 13/1069 24/303 |
| 2014/0199678 A1* | 7/2014 | Tunis | B43L 1/00 434/408 |
| 2014/0203058 A1* | 7/2014 | Lundy | A45F 3/00 224/645 |
| 2015/0157113 A1* | 6/2015 | Anelevitz | A45F 3/04 224/576 |
| 2015/0268009 A1* | 9/2015 | Tunis, III | B43L 1/00 89/36.02 |
| 2016/0007719 A1* | 1/2016 | Harstvedt | A45F 3/04 224/645 |

* cited by examiner

BACKPACK HAVING A DISPLAY

CROSS-REFERENCE TO RELATED APPLICATIONS

This application claims the benefit of priority to U.S. Provisional Patent Application No. 62/439,717, filed Dec. 28, 2016, U.S. Provisional Patent Application No. 62/547,341, filed Aug. 18, 2017, and is a continuation in part of U.S. patent application Ser. No. 15/853,097, filed Dec. 22, 2017, the entirety of which are incorporated herein by reference.

STATEMENT REGARDING FEDERALLY SPONSORED RESEARCH OR DEVELOPMENT

Not Applicable.

FIELD

The present disclosure relates to customizable bags and, more particularly, to customizable backpacks having a ferromagnetic platform coupled to the bag. The ferromagnetic platform may include one or more printed images or designs provided by a user to manufacturer, a magnetic material, and a drawable surface.

BACKGROUND

Bags, and particularly backpacks, remain a popular consumer good. Backpacks are often used by students to carry books and other school supplies but may also be used for work and travel. Backpacks provide an opportunity for self-expression, but prior art backpacks and other bags are limited in their ability to allow consumers to customize them. Consumers are often limited to the available colors, patterns, and/or other decorative elements chosen by the manufacturer. The decorative element may include emblems of a sports team, television show, movie and/or videogame characters, musicians or bands, etc. that a consumer finds desirable. Over time, the consumer may lose interest in the color, pattern, and/or decorative element. Due to the fixed nature of a bag's panels, consumers cannot easily and reversibly change or alter an image or design on the panels. There remains a need for a bag that is easily and reversibly designed by the consumer.

BRIEF SUMMARY

The present disclosure relates to a customizable bag that allows users to create their own custom branded bag by attaching pictures or other art work in one or more ways. The customizable bag includes one or more panels that form a storage compartment, the storage compartment defining a storage volume having a height along a y-axis, a width along an x-axis, and a thickness along a z-axis, and a ferromagnetic platform coupled to the one or more panels. The platform may be flexible and is at least partially exposed. The platform has an outer surface that lies substantially in a z-y plane and is configured to removably mount items formed of a magnetic material. The outer surface further comprises a drawable surface. In some embodiments, the outer surface of the ferromagnetic platform is made from a least one of a metal, a laminated wood or chip board, a laminate, a polyester or acrylic-faced material, a porcelain, a fiberglass, and a glass. In some embodiments, the metal is an enameled metal. The backpack may include material other than metal, such as a whiteboard material, chalkboard, or similar type of materials that can be colored or drawn on. In some embodiments, the outer surface is a washable surface or may have a sacrificial coating. In some embodiments, the user provides one or more images or designs to the manufacturer by uploading the image or design to manufacturer's website. The manufacturer may print or affix the one or more images or designs onto the outer surface. In some embodiments, the images or design may be attached using magnets, photo magnets, branded magnets, etc. The image or design may be attached by hook and loop fasteners or by insertion of the artwork into a clear sleeve, packet, or other backing on the bag. In some embodiments, the image or design may be one or more of an emblem, a digital image, and a graphical work of art. In some embodiments, the ferromagnetic platform may be reversibly coupled the one or more panels. The ferromagnetic platform may be coupled to the one or more panels by means of one or more of hook and loop fasteners, rivets, snaps, clips, pins, buttons, zippers, latches, grommets, magnets, sewing, or by insertion into a clear sleeve, packet, or other backing on the bag. In some embodiments, the bag comprises one or more straps. The one or more panels of the bag may comprise a flexible fabric. The storage compartment may be sealable by hook and loop fasteners, rivets, snaps, clips, pins, buttons, zippers, latches, grommets, and magnets. The outer surface of the ferromagnetic platform may be exposed when the storage compartment is sealed. In some embodiments, the bag further comprises one or more magnetic ornaments or magnetic images.

The present disclosure also relates to a system for creating a customizable bag comprising a computer network configured to receive one or more images or designs provided by a user and a printer configured to print or affix the one or more printed images or designs onto an outer surface of a customizable bag. The user may provide the images or designs by uploading them onto a website. The system may further comprise a computer network configured to receive replacement images or designs provided by the user. A user may change the image or design at any time by obtaining a new one by uploading a new image to the website.

In some embodiments of the present disclosure, the customizable bag includes one or more panels that form a storage compartment. The storage compartment may define a storage volume with an access opening and have a height along a y-axis, a width along an x-axis, and a thickness along a z-axis. The bag may include a ferromagnetic platform coupled to the one or more panels. The ferromagnetic platform includes an exposed stain-resistant, non-porous, cured coating on a surface that lies substantially in a z-y plane. The platform may be configured to permit removeable mounting of one or more items formed of a magnetic material, and its surface may include a drawable surface. Optionally, the ferromagnetic platform may include one or more layers made of metal, laminated wood or chip board, laminate, polyester or acrylic-faced material, porcelain, fiberglass, and/or glass. Optionally, the metal layer of the ferromagnetic platform is an enameled metal. The surface of the platform may include a washable surface and/or a sacrificial coating. The items formed of a magnetic material may include one or more image or design magnets provided by a user. The image or design magnets may be emblems, digital images, and/or graphical works of art. The ferromagnetic platform of the bag may be coupled to the one or more panels. Optionally, the ferromagnetic platform may be coupled to the one or more panels by hook and loop fasteners, rivets, snaps, clips, pins, buttons, zippers, latches, grommets, magnets, sewing, and/or insertion into a clear sleeve, packet, or other backing on the bag. Optionally, the bag includes one or more straps. Optionally, the panels of the bag are a flexible fabric. The storage compartment may be sealable by hook and loop fasteners, rivets, snaps, clips, pins, buttons, zippers, latches, grommets, and magnets. Optionally, the surface of the ferromagnetic platform is exposed when the storage compartment is sealed. The bag may include one or more magnetic ornaments or magnetic images.

In some embodiments of the present disclosure, the system for creating images or designs by a user for customizing a customizable bag includes a computer network and at least one digital input device for use by the user. The input device may be specially configured to input one or more images or designs selected by the user and to transmit the one or more images or designs to the computer network of a service provider. The computer network may be in communication with a receiving computer network that includes at least one receiving computer processor configured to receive the one or more images or designs provided by the user and an output device including a printer in communication with the receiving computer processor and configured to print or affix the one or more printed images or designs to a printing surface configured to be affixed to a magnetic layer of the customizable bag. The receiving computer network or computer processor may be in communication with one or more receiving data storage devices. The receiving computer network and associated hardware and software may be that of a service provider for the approach described herein. In some embodiments, the digital input device is configured so that the user may transmit the one or more images or designs to the computer network by uploading the images or designs onto a website of a service provider. A user may use a graphic user interface of a computer work station or cell phone to select one or more desired images hosted on a data storage device within the receiving network provided by the service provider. Optionally, the graphic user interface may enable the user to alter one or images within the receiving data storage device to create a unique image. Optionally, at least one digital input device is configured so that the user may transmit the one or more images or designs to the computer network using a kiosk.

In yet another embodiment, a customizable bag kit has a bag with one or more flexible panels. The bag also has a storage compartment formed by the one or more flexible panels. The storage compartment defines a storage volume with an access opening and has a height along a y-axis, a width along an x-axis, and a thickness along a z-axis. The bag also has a ferromagnetic platform coupled to the one or more panels. The platform has an exposed stain=resistant, non-porous, cured coating on an outer surface that lies substantially in the z-y plane of the platform. The platform is configured to permit removeable mounting of one or more items formed of a magnetic material. The outer surface of the platform is a drawable surface. The kit also contains one or more customizable items formed of magnetic material comprising ornaments or magnetic images.

DETAILED DESCRIPTION

The following description includes various embodiments of the present approach. The description is not to be taken in a limiting sense, and is made merely for the purpose of illustrating the general principles of the present approach.

Figure 1:
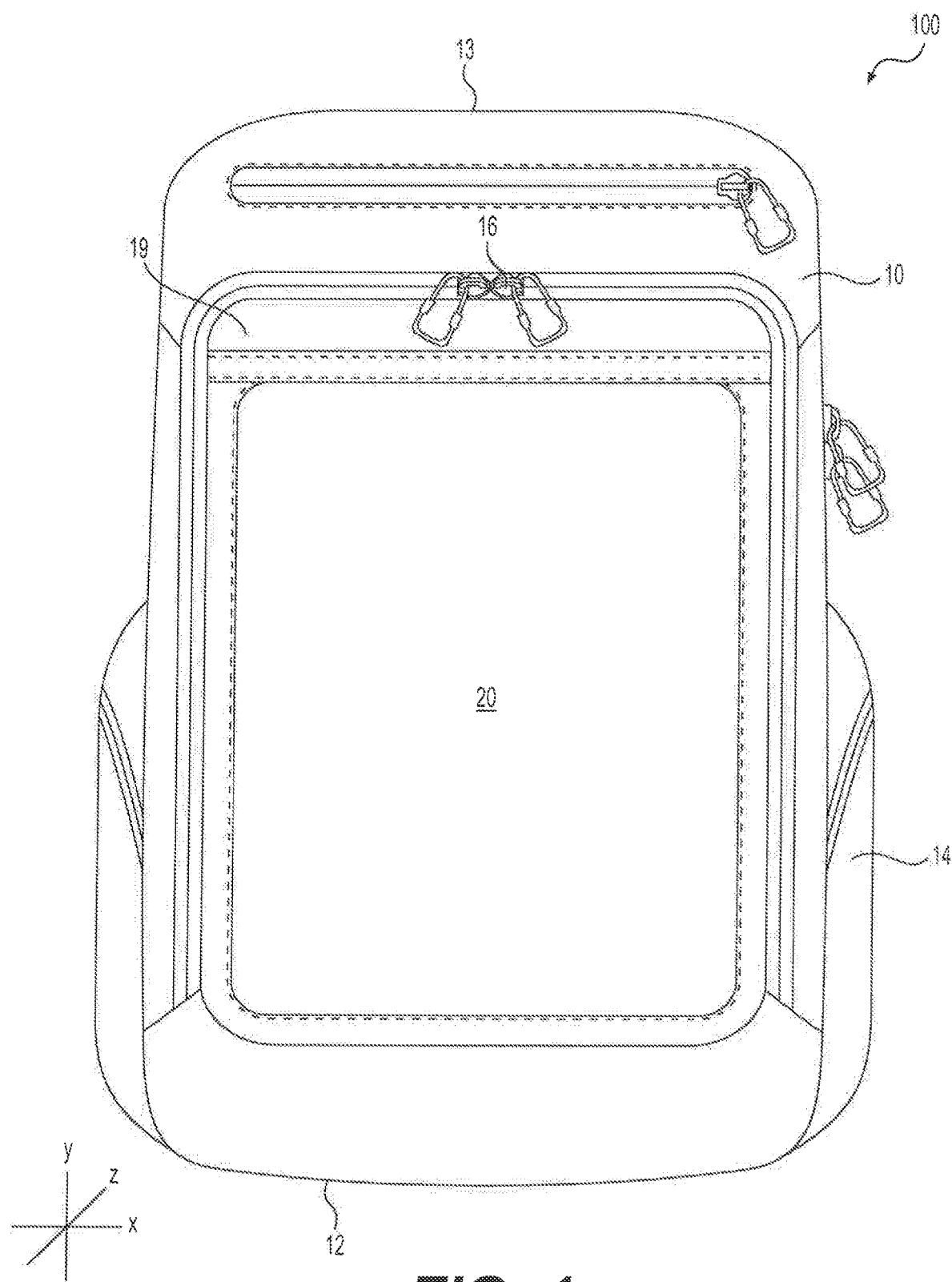
FIG. 1 is a front perspective view of one embodiment of a bag with reference axes shown and labeled.

FIG. 1 illustrates a front perspective view of an embodiment of customizable bag 100 with references axes shown and labeled. The customizable bag 100 comprises one or more panels that form a storage compartment. In some embodiments, the customizable bag 100 comprises a front panel 10, a back panel 11, a base panel 12, a top panel 13, and two side panels 14 that form a storage compartment, the storage compartment defining a storage volume having a height along a y-axis, a width along an x-axis, and a thickness along a z-axis. In some embodiments, the bag 100 may also comprise a forward panel 19. The forward panel 19 may have an aperture defined by the inner surface of the forward panel 19. FIG. 1 shows an embodiment in which a ferromagnetic platform 20 is coupled to the forward panel 19. It should be appreciated by one of skill in the art that ferromagnetic platform 20 may be coupled to one or more other panels.

It should be appreciated by one of skill in the art that customizable bag 100 may include many types of bags or cases including, for example, a backpack, book bag, purse, briefcase, luggage, satchel, lunch box, gym bag, tote, messenger bag, clutch, wallet, musical instrument case, and any other appropriate bag now known or later developed. It should be appreciated that customizable bag 100 may be constructed from flexible materials including polyester fabric, nylon fabric, canvas, leather, and plastic.

Figure 2:
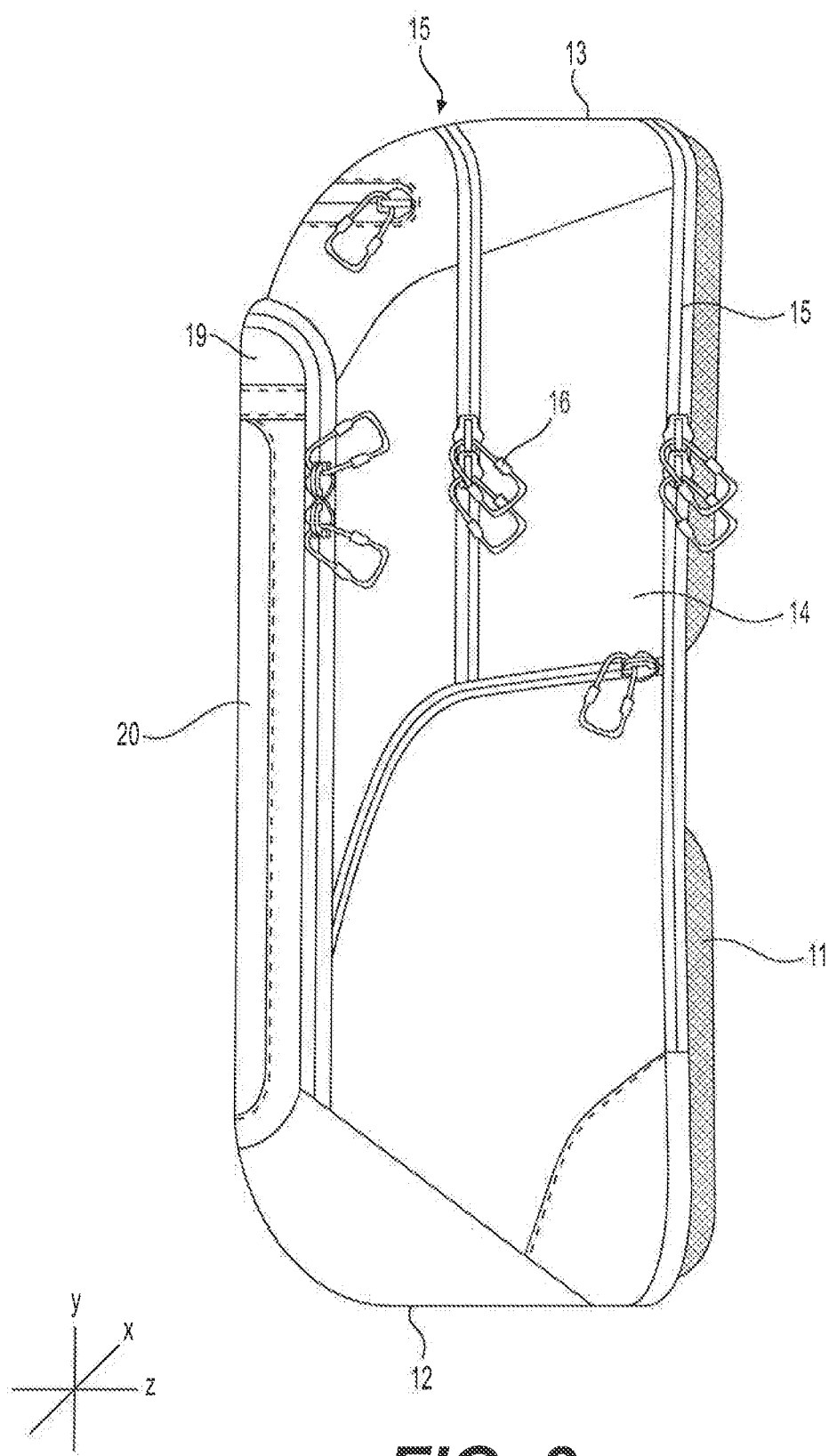
FIG. 2 is a side perspective view of one embodiment of a bag with reference axes shown and labeled.

FIG. 2 illustrates a side perspective view of an embodiment of customizable bag 100 with reference axes shown and labeled. In some embodiments, the customizable bag 100 may include one or more compartments 15. The one or more compartments 15 may be sealable by zippers 16. In some embodiments, the compartments 15 may be configured to remain permanently open or may be sealable by hooks and fasteners, clips, pins, buttons, rivets, snaps, latches, grommets, magnets, and other means known in the art. As shown in FIG. 2, the outer surface of the ferromagnetic platform 20 may be exposed when the compartments 15 are sealed.

Figure 3:
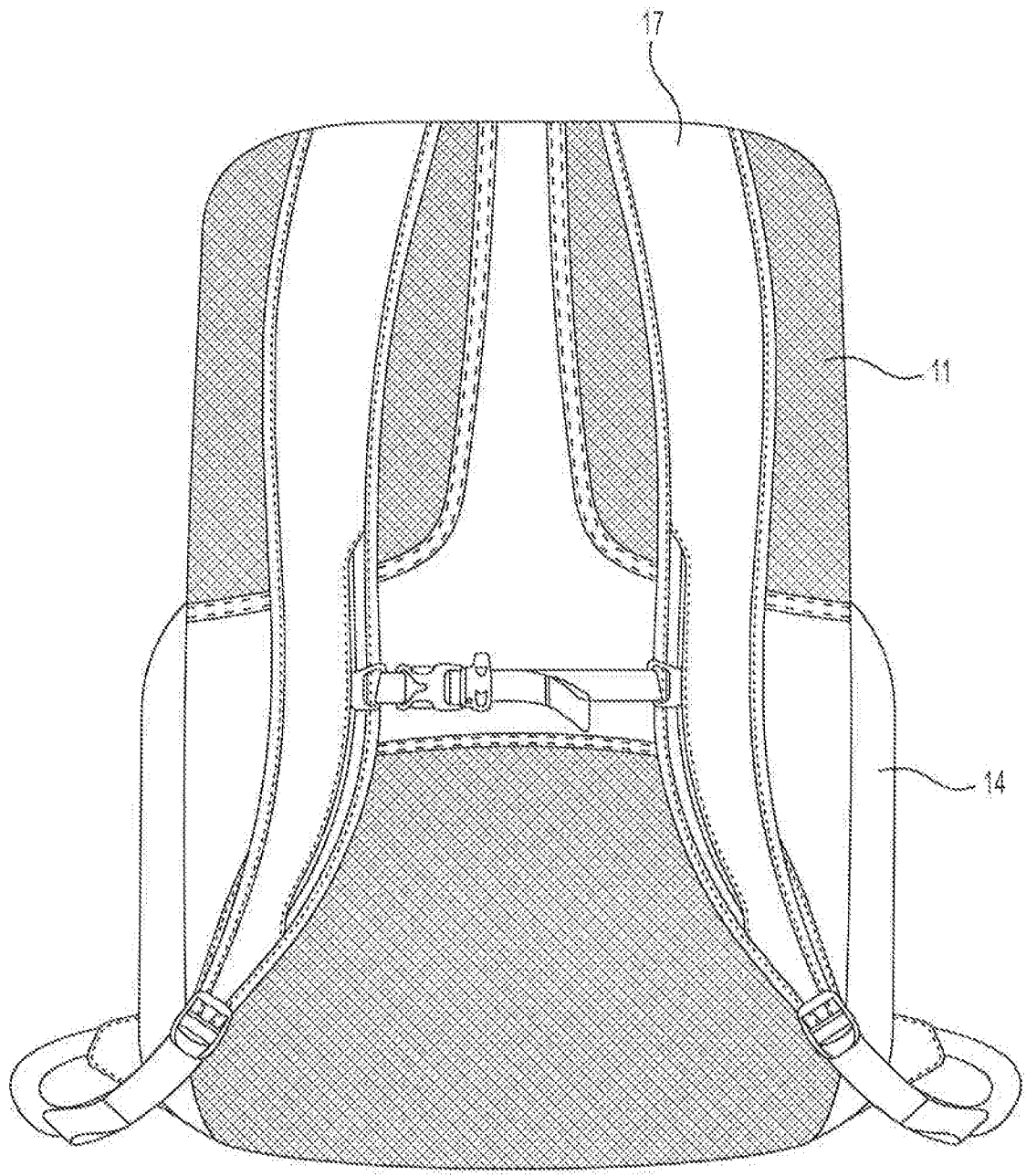
FIG. 3 is a rear perspective view of one embodiment of a bag with reference axes shown and labeled.

FIG. 3 illustrates a rear perspective view of an embodiment of customizable bag 100 with reference axes shown and labeled. In some embodiments, the customizable bag 100 may include one or more straps 17. The one or more straps 17 may be configured to pass over one or both shoulders of a user or may be configured to be held. The one or straps 17 may be adjustable.

Figure 4:
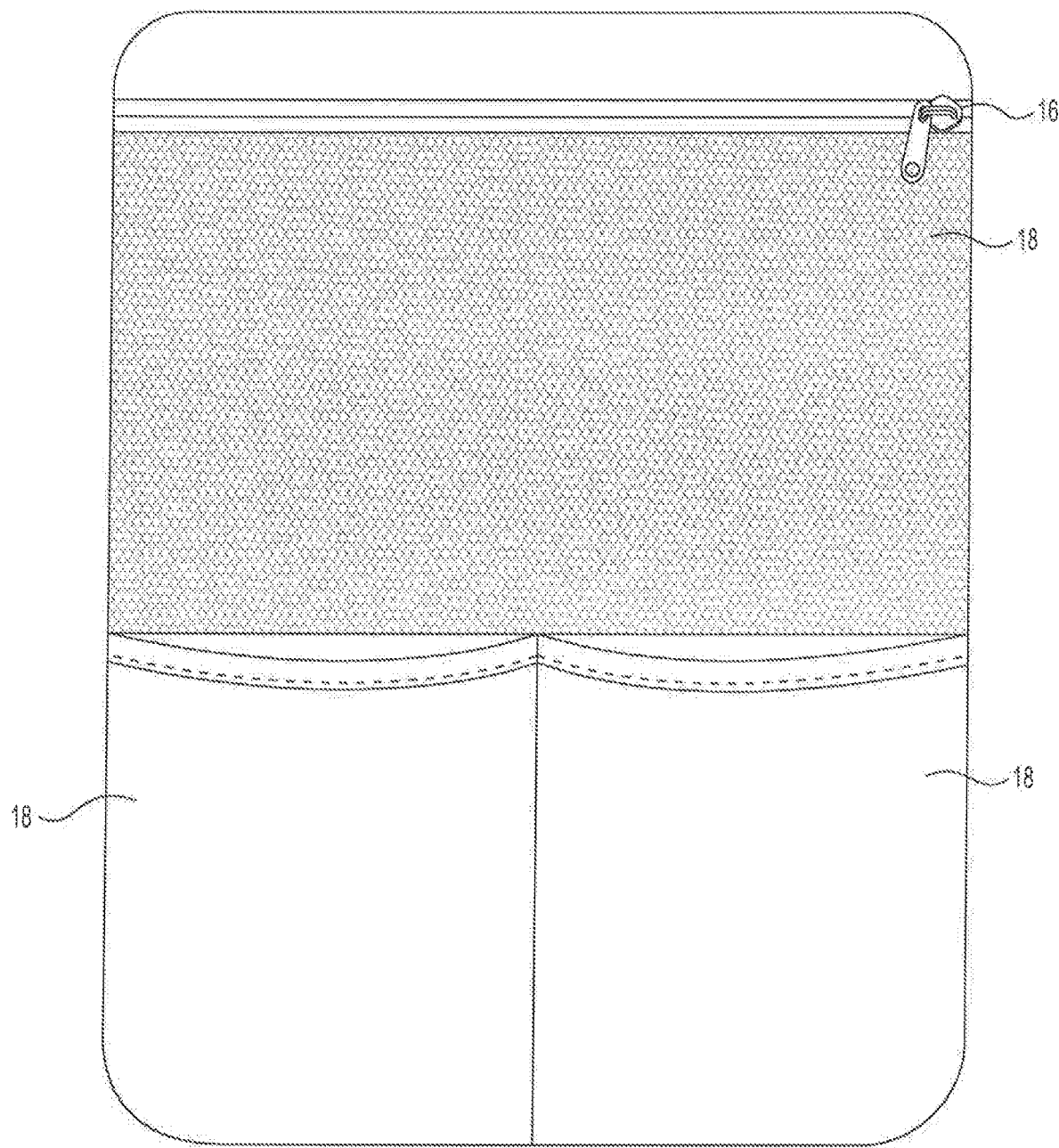
FIG. 4 is a partial front perspective view of one embodiment of an inside front pocket facing towards the rear of a bag.
Figure 5:
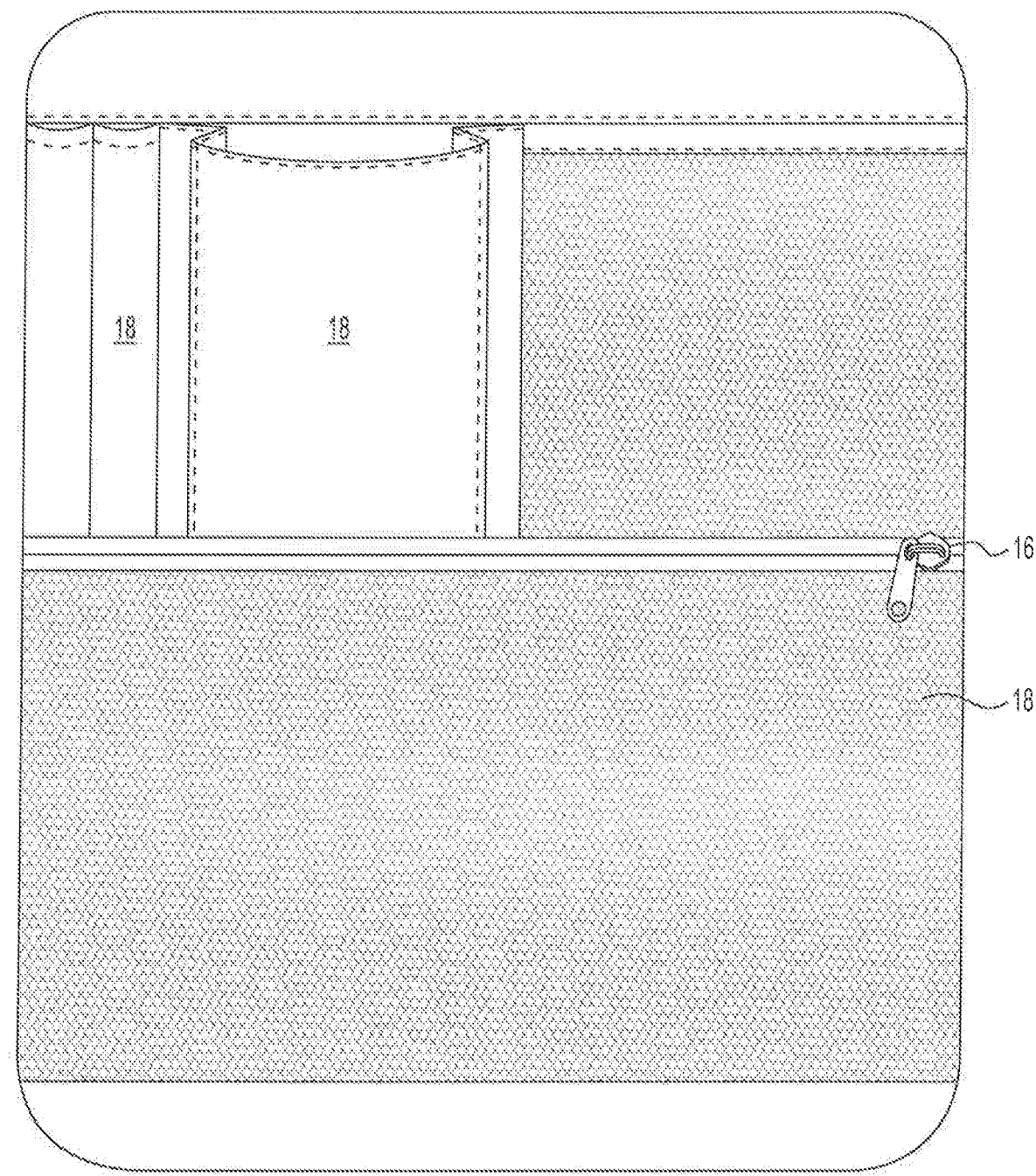
FIG. 5 is a partial front perspective view of one embodiment of an inside front pocket facing towards the front of the bag.

In some embodiments, customizable bag 100 includes one or more pockets 18 within the storage compartment. FIG. 4 illustrates a partial front perspective view of one embodiment of an inside pocket 18 facing towards back panel 11 of customizable bag 100 (not shown). FIG. 5 illustrates a partial front perspective view of one embodiment of an inside pocket 18 facing towards front panel 10 of customizable bag 100 (not shown). In some embodiments, pocket 18 may be permanently open or may be sealable by hooks and fasteners, clips, fins, buttons, rivets, snaps, latches, grommets, magnets, and other means known in the art. FIG. 4 shows one embodiment having two open pockets 18 and one pocket 18 sealed with zipper 16. In some embodiments, the one or more pockets 18 may be configured to have varying storage volumes. FIG. 5 shows one embodiment having pockets 18 with three different storage volumes. In some embodiments, one or more pockets 18 are located on an exterior surface of one or more panels.

Figure 6:
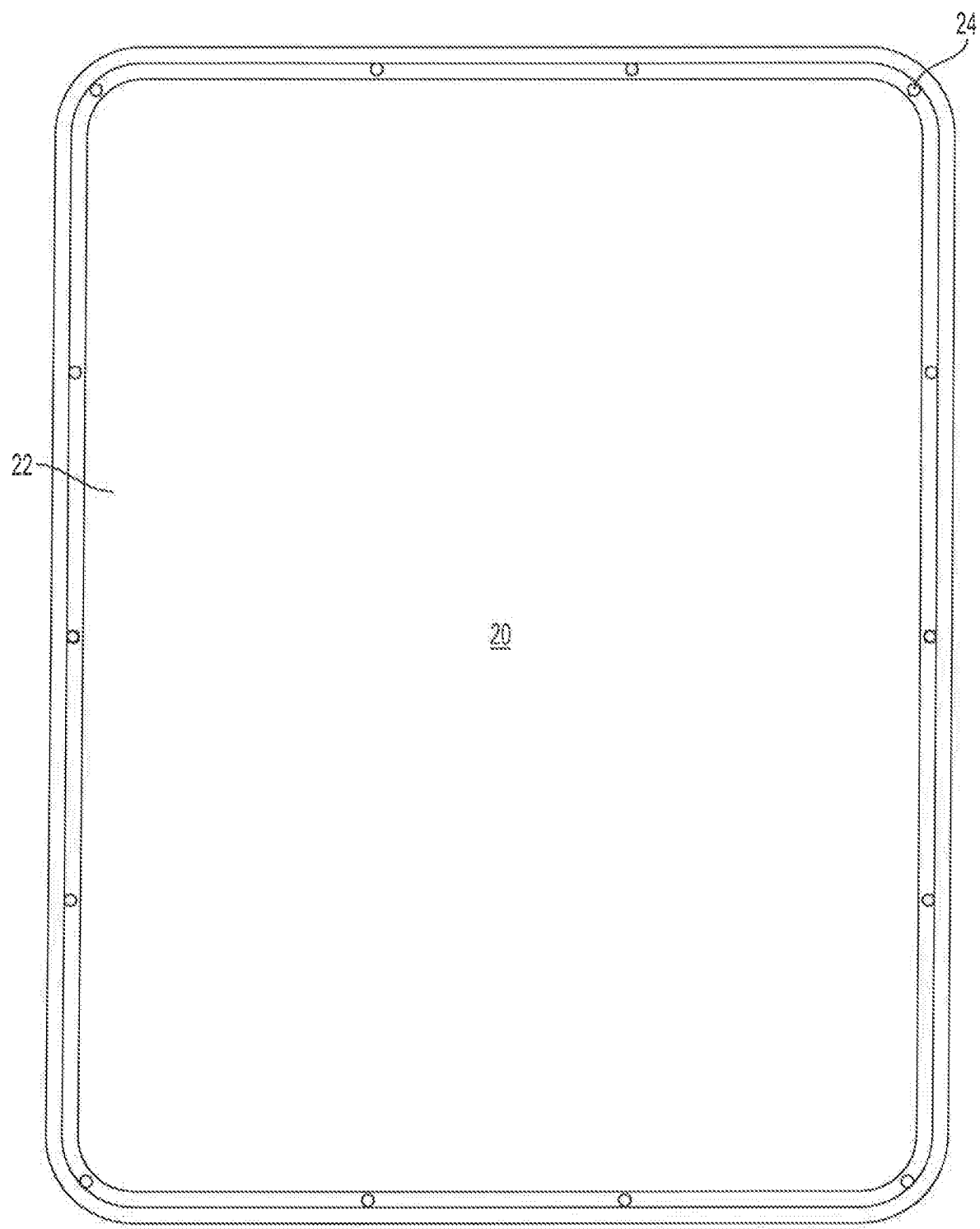
FIG. 6 is a front perspective view of one embodiment of a ferromagnetic platform.

FIG. 6 is a front perspective view of one embodiment of the ferromagnetic platform having an exposed outer surface 22. The ferromagnetic platform 20 may be constructed from metal (including enameled metal) laminated wood or chip board, a laminate, polyester or acrylic-faced material, porcelain, fiberglass, and glass. The ferromagnetic platform 20 having the exposed outer surface 22 may be coupled to the one or more panels and may lie substantially in a z-y plane, meaning that the ferromagnetic platform 20 is substantially vertical. In some embodiments, the ferromagnetic platform 20 may be coupled to an outer surface of one or more panels. In some embodiments, ferromagnetic platform 20 may be removably attached to one or more panels by hooks and fasteners, clips, pins, buttons, rivets, snaps, zippers, latches, grommets, magnets, and other means known in the art. The ferromagnetic platform 20 may have at least one aperture 24 to facilitate the coupling to the one or more fabric panels. In some embodiments, ferromagnetic platform 20 may be attached to one or more panels by insertion into a clear sleeve, packet, or other backing on the customizable bag 100. In some embodiments, the ferromagnetic platform 20 may be sewn onto one or more panels.

Figure 7:
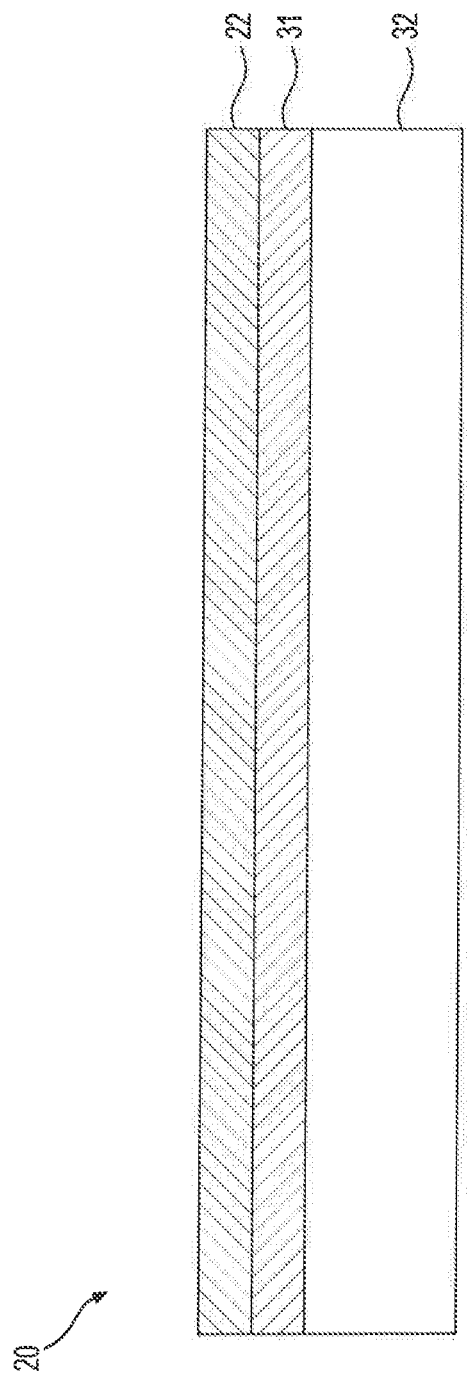
FIG. 7 is a side perspective view of one embodiment of the ferromagnetic platform with layers shown.

FIG. 7 is a side view showing one embodiment of the platform having one or more layers. In the embodiment shown, the platform 20 includes three layers. The platform 20 may include an exposed outer surface 22, a ferromagnetic layer 31, and a substrate layer 32. It should be appreciated that there may be more than one ferromagnetic layer and/or substrate layer.

Figure 8:
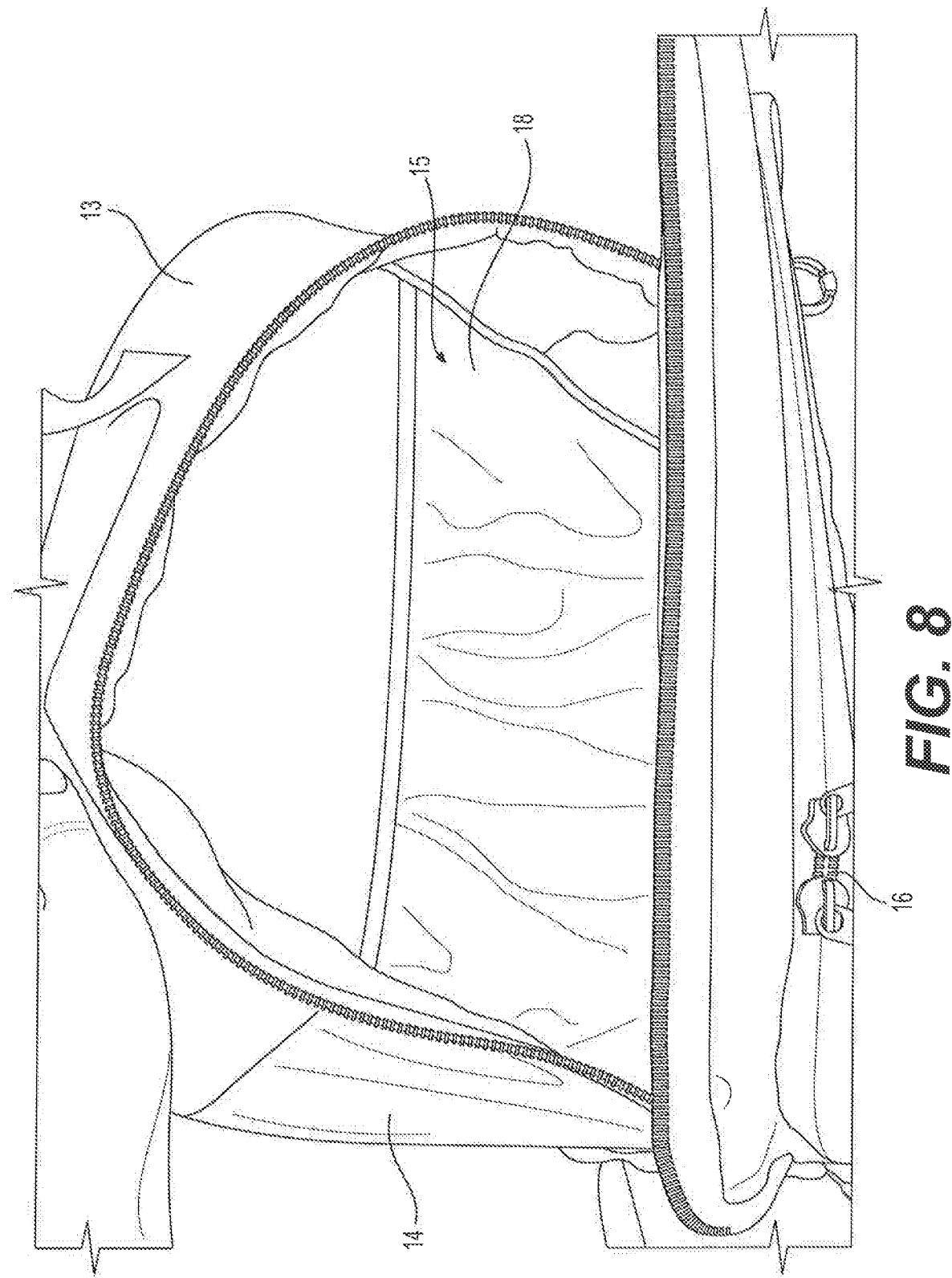
FIG. 8 is top perspective view of one embodiment of a bag.
Figure 9:
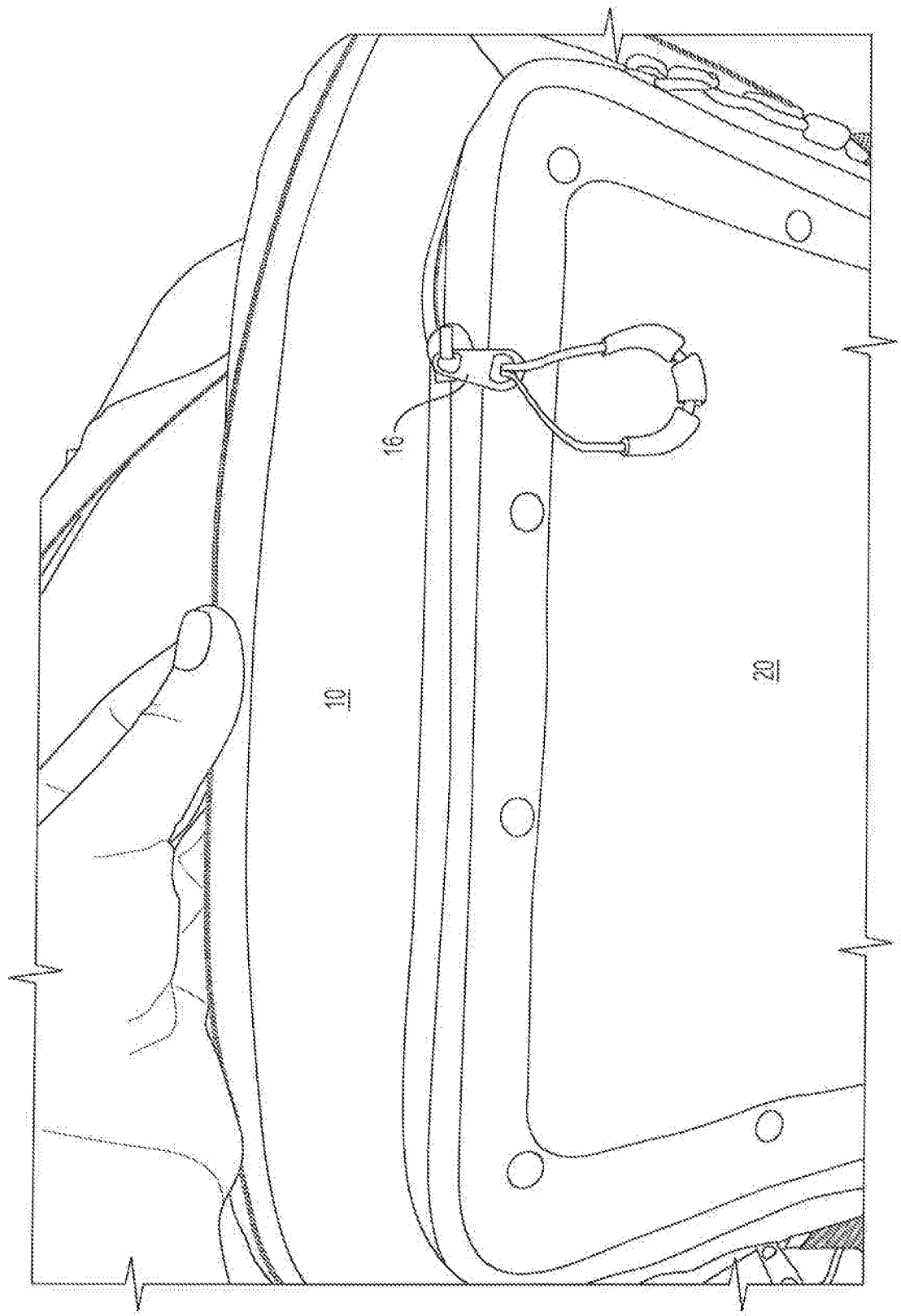
FIG. 9 is a front perspective view of one embodiment of a bag with reference axes shown and labeled.

FIG. 8 is top perspective view of one embodiment of customizable bag 100. FIG. 9 shows one embodiment having one pocket 18.

Figure 10:
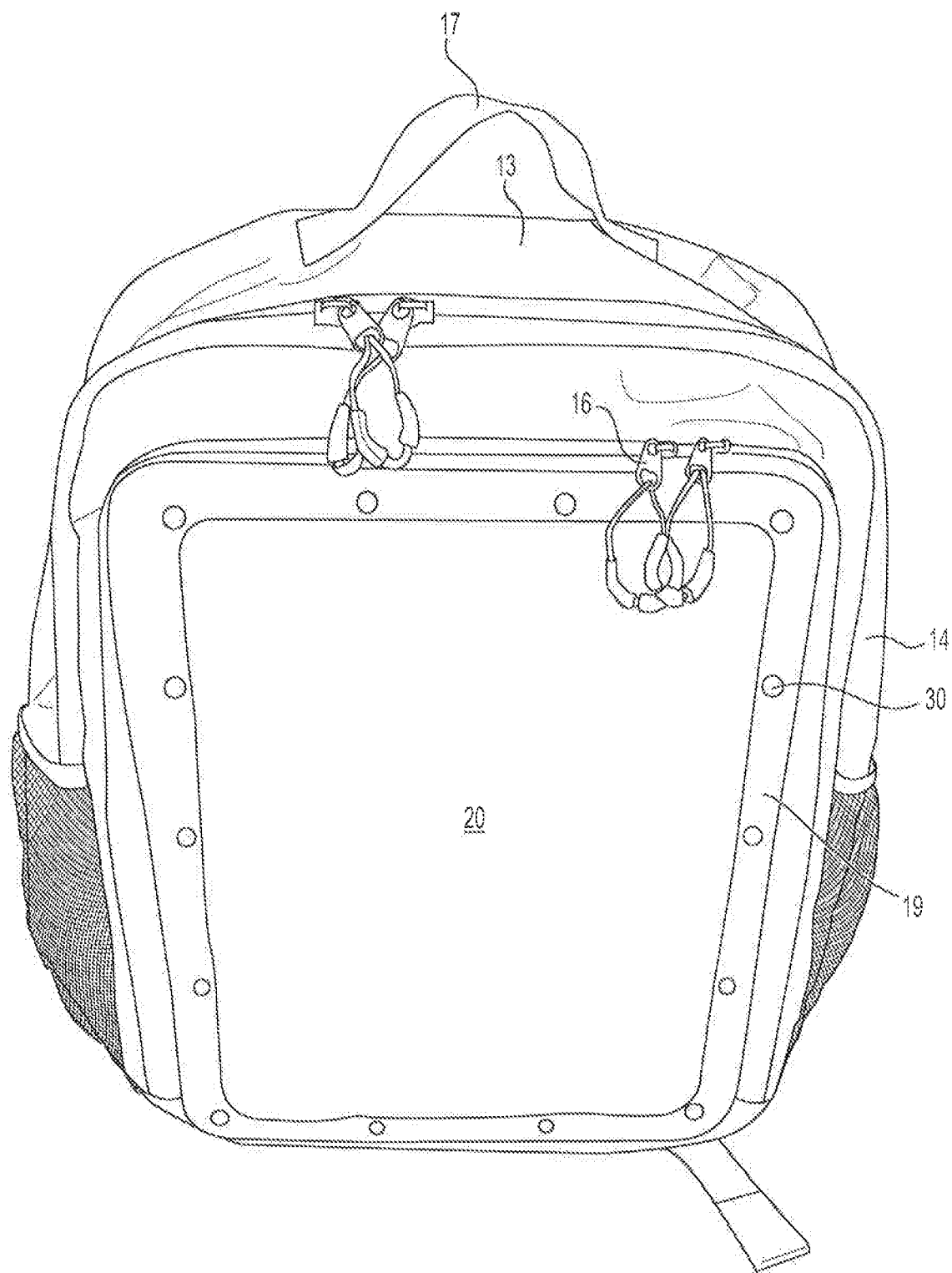
FIG. 10 is a front perspective view of one embodiment of a bag with reference axes shown and labeled.

FIG. 9 and FIG. 10 show front perspective views of one embodiment of customizable bag 100. In the shown embodiment, ferromagnetic platform 20 may be attached to forward panel 19 by a plurality of rivets 30. It should be appreciated that ferromagnetic platform 20 may be attached by other means including hook and loop fasteners, rivets, snaps, clips, pins, buttons, zippers, latches, grommets, magnets, sewing, or by insertion into a clear sleeve, packet, or other backing on the bag. In some embodiments, the apertures of the ferromagnetic platform 20 (shown in FIG. 6) are sized to accept the rivets 30.

Figure 11:
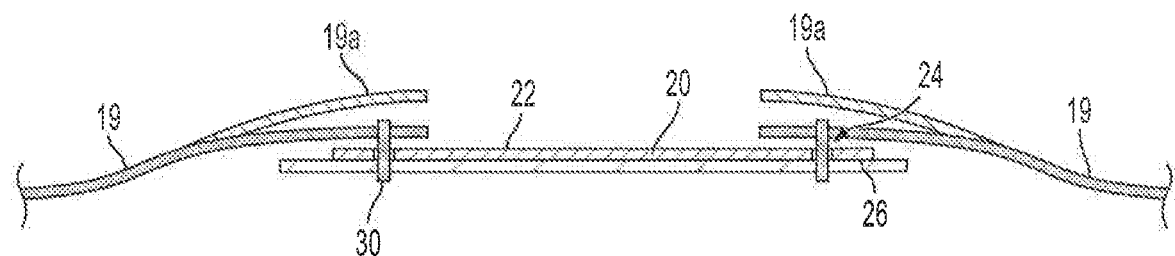
FIG. 11 is a cross sectional view of a ferromagnetic platform coupled to the bag according to one embodiment of the bag.

The ferromagnetic platform 20 may be coupled to the at least one fabric panel. As shown in FIG. 11, the ferromagnetic platform 20 may be coupled to the forward panel 19. The ferromagnetic platform 20 may be coupled to the forward panel 19 by using rivets 30 and the apertures 24. In some embodiments, the ferromagnetic platform 20 may be coupled proximate the aperture of the forward panel 19 such that the outer surface 22 may be at least partially exposed through the aperture. In some embodiments, the aperture may be entirely covered by the ferromagnetic platform 20.

The forward panel 19 may further comprise a second layer of fabric that forms at least one flap 19a. The flap 19a may extend toward the inner surface of the forward panel 19. In some embodiments, the flap 19a may end proximate the inner surface of the forward panel 19. In other embodiments, the flap 19a may not extend beyond the inner surface of the forward panel 19. In still other embodiments, the flap 19a may entirely cover the aperture of the forward panel 19 as well as the outer surface 22 of the ferromagnetic platform 20. In some embodiments, the flap 19a may be moveable and may be configured to be tied up when the outer surface 22 is in use.

The bag 100 may further comprise a plastic plate 26 coupled to the ferromagnetic platform 20. The plastic plate 26 may be coupled to the ferromagnetic platform 20 at a surface opposite the outer surface 22. The plastic plate 26 may bolster the ferromagnetic platform 20 so that the ferromagnetic platform 20 appears to have increased rigidity and stability. In some embodiments, the plastic plate may be rigid. In other embodiments, the plastic plate is flexible. This may increase user satisfaction when using the ferromagnetic platform 20 as a drawing surface. The plastic plate 26 may be coupled to only a portion of the ferromagnetic platform 20. In some embodiments, and as shown in FIG. 11, the plastic plate 26 may be larger than the ferromagnetic platform 20 and extend beyond the ferromagnetic platform 20. The plastic plate 26 may not interfere with the coating on the outer surface 22.

Figure 12:
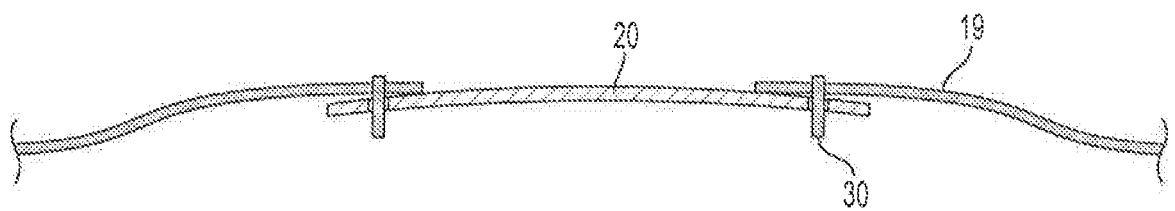
FIG. 12 is a cross sectional view of a flexible ferromagnetic platform coupled to the bag according to one embodiment of the bag

The ferromagnetic platform 20 may be flexible, as is shown in FIG. 12. In some embodiments, the flexibility of the ferromagnetic platform 20 may be beneficial as it allows the ferromagnetic platform 20 to flex and bend with the flexible panels. This may aid in preventing ripping, tearing, or shearing of the bag 100. Further, this may allow a user to fit additional goods inside the compartment as the ferromagnetic platform 20 may be able to flex forward without breaking.

Figure 13:
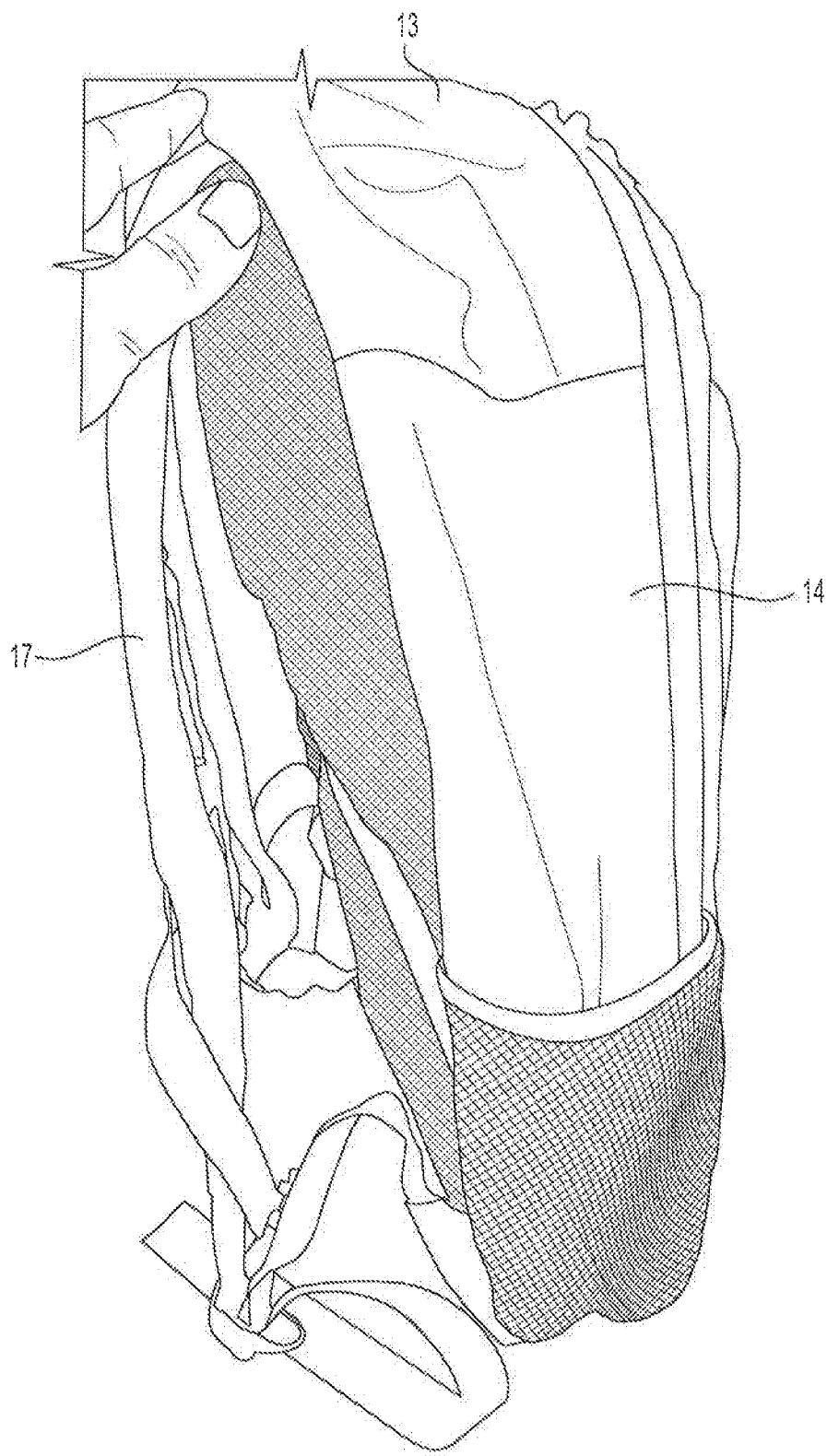
FIG. 13 is a side perspective view of one embodiment of a bag with reference axes shown and labeled.

FIG. 13 is a side perspective view of one embodiment of customizable bag 100 with reference axes shown and labeled. In some embodiments, the customizable bag 100 has one or more mesh compartments 15 attached to one or more panels.

Figure 14:
FIG. 14 is a front perspective view of one embodiment in which a photo is printed onto the outer surface of the bag.
Figure 15:
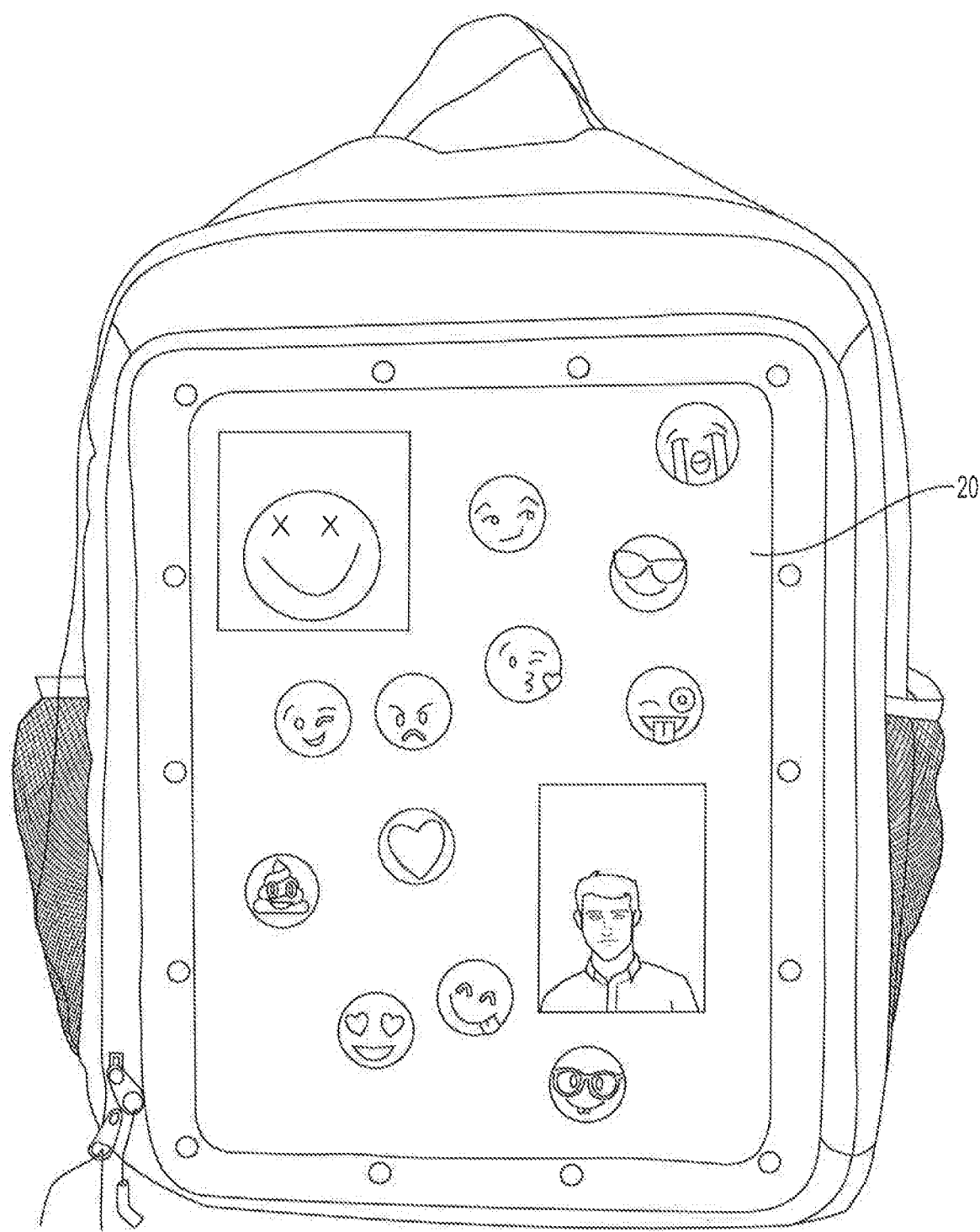
FIG. 15 is a front perspective view of one embodiment in which an emblem is affixed to the bag.

In some embodiments, the ferromagnetic platform 20 may be customizable by addition of one or more images or designs provided to the manufacturer by a user. In some embodiments, the manufacturer of the ferromagnetic platform 20 may offer artwork designs, pictures, and graphics that may be chosen by the user to be printed on an outer surface 22 of ferromagnetic platform 20. FIG. 14 shows an embodiment in which a photo has been selected by the user and is printed on the outer surface 22 of the ferromagnetic platform 20. FIG. 15 shows an embodiment in which a graphic or emblem has been selected by the user is attached to the ferromagnetic platform 20. In some embodiments, the user may select the design, picture, or graphic for the ferromagnetic platform 20 in a brick-and-mortar store, in an online store, and through a smart or cellular phone application.

In some embodiments, the manufacturer may provide tools for the user to create his or her own artwork to be printed onto outer surface 22. In some embodiments, the manufacturer may provide a website, an app, or software that may allow a user to select and customize patterns or images within a template for use on outer surface 22. In some embodiments, the manufacturer may permit the user to provide his or her own artwork to the manufacturer to be printed onto outer surface 22. The user may submit the customized patterns or images to the manufacturer, and the manufacturer may then print the customized patterns or images onto the outer surface 22. In some embodiments, the artwork may be printed on or otherwise affixed to the outer surface 22 using a digital printing machine, a dye sublimation system, silk screening techniques, and paint. It should be appreciated by those of skill in the art that other printing methods known in the art may be used.

Figure 16:
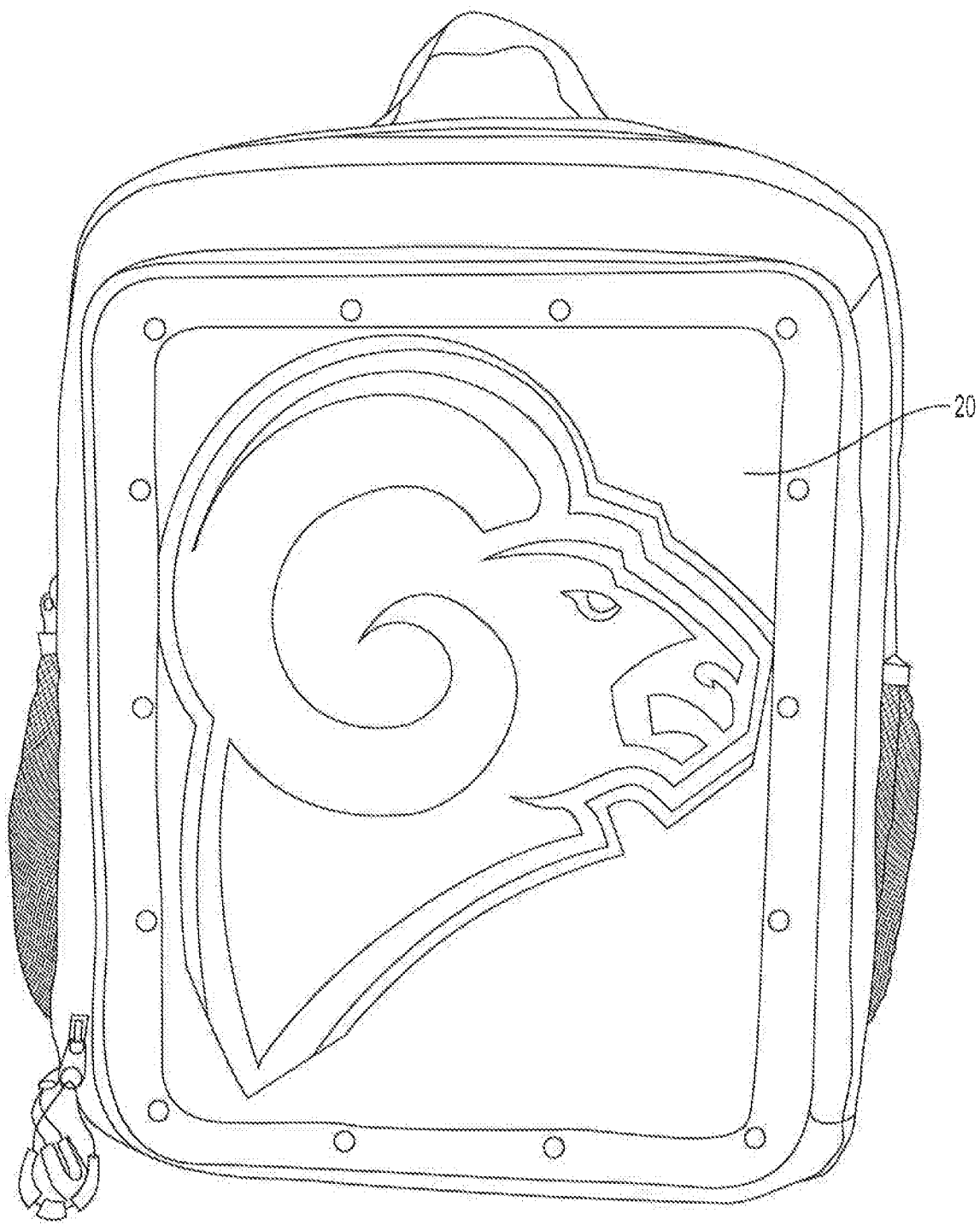
FIG. 16 is a front perspective view of one embodiment in which magnets are affixed to the outer surface of the bag.

In some embodiments, the bag 100 may comprise one or more magnetic ornaments or magnetic images. FIG. 16 shows one embodiment in which the magnets have been attached to ferromagnetic platform 20. The magnets may be coupled to the outer surface 22 of the ferromagnetic platform 20. In some embodiments, the magnets may be coupled directly to the outer surface 22 of the ferromagnetic platform 20. This may allow for increased ferromagnetic force and optimal magnetic connection. If the magnets are not coupled directly to the outer surface 22, the user may risk the ferromagnetic force failing and magnets falling off the bag 100. Magnets allow for quick and easy removal and rearrangement of images or designs. In some embodiments, the magnets may be photo magnets or branded magnets. The image or design magnets may be emblems, digital images, and/or graphical works of art.

In some embodiments, outer surface 22 may be an erasable writing surface configured to be decorated and redecorated as desired by the user. As is shown in FIG. 16, the writing surface may also be configured to receive magnets and other decorations. It may be beneficial to have the outer surface 22 exposed so that the ferromagnetic platform 20 may function as both a drawing surface and a magnetic surface. In some embodiments, a user may use dry erase markers and/or chalk to decorate the erasable writing surface. The erasable writing surface may be white or light-colored to provide high contrast for markers. The outer surface 22 may comprise a sacrificial coating which prevents the markers or chalk from penetrating into the outer surface 22 and allows for easy washing and removal of the markings. The sacrificial coating may be an optically clear polymer such as acrylates, biopolymers, waxes, polyurethanes, fluorinated hydrocarbons, or siloxanes.

The outer surface 22 may be a dry-erase or dry-wipe surface. The outer surface 22 may comprise at least one layer of stain-resistant, non-porous, cured polymeric material comprised of fluorocarbon polymers and a support for the sheet. The fluorocarbon polymer may be at least one of polytetrafluoroethylene (PTFE), fluoroethylene propylene (FEP), and ethylene tetrafluoroethylene copolymer (EFTE). The layer may comprise melamine or a melamine derivative. The layer of polymeric material may be laminated to the support. The sheet may be attached to a painted steel or aluminum support. The layer may be a ceramic fired onto a steel surface.

Figure 17:
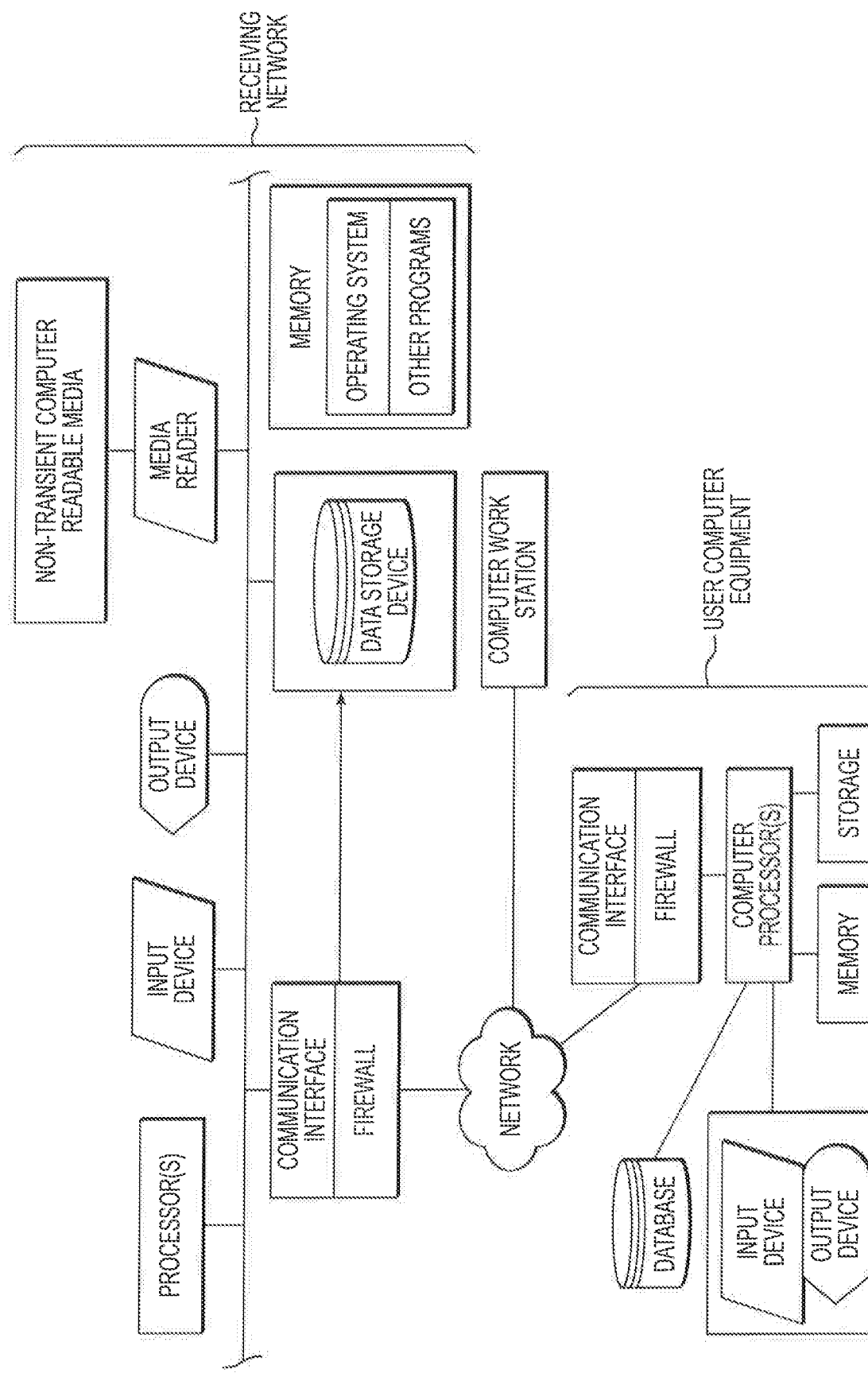
FIG. 17 is a schematic of an embodiment of the system for creating the customization for the customizable bag

The present approach also relates to systems for creating the customization for such a customizable bag, as shown in FIG. 17. The system may include a receiving computer network, such as a receiving network available over the internet through a communication interface with a firewall or other appropriate security device. A receiving processor and data storage device may be specially configured to receive one or more images or designs provided or uploaded by a user, or selected by a user from images or designs stored on a receiving network data storage device. As shown in FIG. 17, on a hosted receiving network end, an output device, such as a printer, may be configured to print or affix the images or designs into a customer useable embodiment, such as onto a useable delivery surface for ultimate placement on a customizable bag. The user may provide the one or more images or designs to the computer network by uploading the images or designs through an input device onto a website, possibly from the user database shown. The receiving computer network may be configured to receive replacement images or designs provided by the user. A printer output device may be configured to print or affix the one or more images or design onto a magnetic image surface for use with a customizable bag.

With reference to FIG. 17, embodiments of the present approach may extend to a digital image taken by or otherwise selected by a user with a cellular phone or digital camera. For example, a user may then transfer, communicate, or submit the image, along with user identification, through a computer work station having a computer processor and communication interface (as shown) or via an application loaded onto a cell phone (not shown) into the receiving network for receipt by a remote ornamentation service provider. Upon receipt, the receiving network may be specifically configured by a receiving computer software program to link or match the image and user identification with the user's account. Alternatively, a user may use a graphic user interface at the user's computer work station or cell phone or at a kiosk to select one or more desired images hosted on a data storage device within the receiving network provided by the service provider. Optionally, the graphic user interface may enable the user's manipulation of images within the receiving data storage device to assemble or create a unique collection, possibly of photographs in combination with desired symbols.

At a desired time, the specially configured processor may place the image within a queue for printing, such as with a service provider's printer being an output device, or possibly with a remote printing facility. The image may be printed onto a separate printing surface, such as vinyl or paper, for subsequent lamination onto a magnetic layer, or directly onto a magnetic substrate suitable for such printing. With account information associated with a particular image, the completed image may then be shipped or otherwise provided to the user.

Computer program instructions for the provider may be installed with a processor of a computer, including a special purpose computer or other programmable data processing apparatus to produce a machine, such that the instructions, which execute via the processor of the computer or other programmable data processing apparatus, create means for implementing the functions/acts specified.

Any computer program instructions may also be stored in a non-transient computer-readable memory, including a networked or cloud-accessible memory, that can direct a computer or other programmable data-processing apparatus to function in a particular manner, such that the instructions stored in the computer-readable memory produce an article of manufacture including instruction means which implement the function/act specified in the flowchart and/or block diagram block or blocks.

Any computer program instructions may also be loaded onto a computer or other programmable data-processing apparatus to specially configure it to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface presented on the display of the mobile communications device, a heads-up display, a head mounted screen, or the like. Prompts may also be audible, vibrating, etc. It is contemplated that printers may include a bar code, Quick Response (QR) Code (including color, high capacity QR Codes), or other linking technology within a printed image, to enable a third-party viewer to access a desired website selected by either the user/customer or by the service provider.

Any flowcharts and block diagrams in the Figures illustrate the architecture, functionality, and operation of possible implementations of systems, methods and computer program products according to various embodiments of the present approach. In this regard, each block may alternatively represent a module, segment, or portion of code, which comprises one or more executable instructions for implementing the specified logical function(s). It should also be noted that, in some alternative implementations, the functions noted in a block may occur out of the order noted in the figures, or may be optional. In some cases, a block may be provided for contextual detail or completeness, even though, for example, the contents may be trivial from a programming perspective. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A customizable bag comprising:
    one or more panels that form a storage compartment, the storage compartment defining a storage volume with an access opening, the storage compartment having a height along a y-axis, a width along an x-axis, and a thickness along a z-axis;
    a ferromagnetic platform having a flexible surface and coupled to the one or more panels via at least one attachment means at one or more attachment areas, the platform having an outer surface that is at least partially exposed comprising an stain-resistant, non-porous, cured coating on a surface that lies substantially in a z-y plane, wherein the platform is configured to permit removeable mounting of one or more items formed of a magnetic material, and wherein the surface comprises a drawable surface; and
    at least one flap to conceal the at least one attachment means;
    wherein the outer surface of the ferromagnetic platform is at least partially exposed when the storage compartment is sealed.

2. The bag of claim 1, wherein the ferromagnetic platform further comprises a layer made from at least one of a metal, a laminated wood or chip board, a laminate, a polyester or acrylic-faced material, a porcelain, a fiberglass, and a glass.

3. The bag of claim 2, wherein the metal layer of the ferromagnetic platform is an enameled metal.

4. The bag of claim 1, wherein the surface comprises a washable surface.

5. The bag of claim 1, wherein the cured coating is a sacrificial coating.

6. The bag of claim 1, wherein the one or more items formed of a magnetic material further comprise one or more image or design magnets.

7. The bag of claim 6, wherein the image or design magnets is one or more of an emblem, a digital image, and a graphical work of art.

8. The bag of claim 1, wherein the at least one attachment means is selected from the group consisting of one or more of hook and loop fasteners, rivets, snaps, clips, pins, buttons, zippers, latches, grommets, magnets, sewing, and insertion into a clear sleeve, packet, or other backing on the bag.

9. The bag of claim 1, wherein the bag further comprises one or more straps.

10. The bag of claim 1, wherein the one or more panels comprise a flexible fabric.

11. The bag of claim 1, wherein the storage compartment is sealable by means of one or more of hook and loop fasteners, rivets, snaps, clips, pins, buttons, zippers, latches, grommets, and magnets.

12. The bag of claim 1, further comprising a plastic panel coupled to a rear surface of the ferromagnetic platform.

13. A customizable bag kit comprising:
    a bag having one or more flexible panels, the bag further comprising:

a storage compartment formed by the one or more flexible panels, the storage compartment defining a storage volume with an access opening, the storage compartment having a height along a y-axis, a width along an x-axis, and a thickness along a z-axis;

a ferromagnetic platform coupled to the one or more panels via at least one attachment means at one or more attachment areas, the platform comprising an exposed stain-resistant, non-porous, cured coating on an outer surface that lies substantially in a z-y plane of the platform, wherein the platform is configured to permit removeable mounting of one or more items formed of a magnetic material, and wherein the surface comprises a drawable surface; and at least one flap to conceal the at least one attachment means;

wherein the outer surface of the ferromagnetic platform is at least partially exposed when the storage compartment is sealed; and one or more customizable items formed of magnetic material comprising ornaments or magnetic images.

14. The customizable bag of claim 13, wherein the ferromagnetic platform is flexible.

15. The customizable bag of claim 14, wherein a plastic plate is coupled to at least a portion of the ferromagnetic platform.

16. The customizable bag of claim 15, wherein the plastic plate is coupled to an inner surface of the ferromagnetic platform and does not interfere with the coating on the outer surface.

* * * * *